United States Patent
Mizushima et al.

[11] Patent Number: 5,988,817
[45] Date of Patent: Nov. 23, 1999

[54] MULTIPROJECTION SYSTEM

[75] Inventors: Nobuyuki Mizushima, Hidaka; Takao Kitada, Tokorozawa; Ikunobu Usui, Higashimurayama; Shinjiro Ejima, Tama; Yasunori Ito, Tokyo; Shinichi Hamabuti, Tokyo; Hideki Hirasawa, Tokyo, all of Japan

[73] Assignees: RDS Corporation; Tokyo Butai Shomei Co., Ltd.; Meiko-Multi Art Inc., all of Tokyo, Japan

[21] Appl. No.: 08/986,807

[22] Filed: Dec. 8, 1997

[30] Foreign Application Priority Data

Feb. 28, 1997 [JP] Japan .................................. 9-045349
Aug. 13, 1997 [JP] Japan .................................. 9-218573

[51] Int. Cl.⁶ .................................................. G03B 21/14
[52] U.S. Cl. ............................ 353/94; 353/30; 352/133
[58] Field of Search .............................. 353/94, 46, 48, 353/30; 352/133, 70, 69

[56] References Cited

U.S. PATENT DOCUMENTS

| | | | |
|---|---|---|---|
| 3,359,855 | 12/1967 | Webb | 353/48 |
| 3,602,582 | 8/1971 | Torricelli | 352/133 |
| 3,749,484 | 7/1973 | Busche | 353/94 |
| 4,392,187 | 7/1983 | Bornhorst | 362/233 |
| 4,980,806 | 12/1990 | Taylor et al. | 362/85 |
| 5,029,992 | 7/1991 | Richardson . | |
| 5,085,495 | 2/1992 | Iwahara et al. | 353/94 |
| 5,206,760 | 4/1993 | Nakashima et al. | 359/457 |
| 5,365,288 | 11/1994 | Dewald et al. | 353/98 |
| 5,664,353 | 9/1997 | Brauer et al. | 353/94 |

FOREIGN PATENT DOCUMENTS

| | | |
|---|---|---|
| 5-19346 | 1/1993 | Japan . |
| 8-54593 | 2/1996 | Japan . |

Primary Examiner—William Dowling
Attorney, Agent, or Firm—Frishauf, Holtz, Goodman, Langer & Chick

[57] ABSTRACT

Disclosed is a multiprojection system in which an image can be freely projected by plural projectors so that projected images of the plural projectors are arranged in lines longitudinally and laterally and all of the projected images become one image; an entirely enlarged image or divided images can be projected; or an individual image can be projected, which comprises each of the plural projectors being provided independently with a pan driving device and a tilt driving device so that the direction of projection can be freely changed; and having at least one of functions of changing the direction of projection, the position of a projected image, the synthesis, shape or arrangement of an image and/or the size of an image and displaying each image in a flying state to constitute a screen image system harmonized with lighting in a representation space.

13 Claims, 7 Drawing Sheets

| A | A | A |
|---|---|---|
| A | A | A |
| A | A | A |

Fig. 1 (c)

| A | | B |
|---|---|---|
| | | B |
| B | B | B |

| A | B | C |
|---|---|---|
| B | C | A |
| C | A | B |

Fig. 1 (f)

|   | Y-1 | Y-2 | Y-3 |
|---|---|---|---|
| X-1 | ◎ | ◎ | ◎ |
| X-2 | ◎ | ◎ | ◎ |
| X-3 | ◎ | ◎ | ◎ |

MULTIPROJECTION SYSTEM

BACKGROUND OF THE INVENTION

This invention relates to a multiprojection system using plural projectors, in which the arrangement and size of images can be freely changed and each image can be freely flown, and particularly to a multiprojection system which enables changeful representation as a new screen image system in which a screen image is harmonized with lighting in a representation space.

Figure 7A:
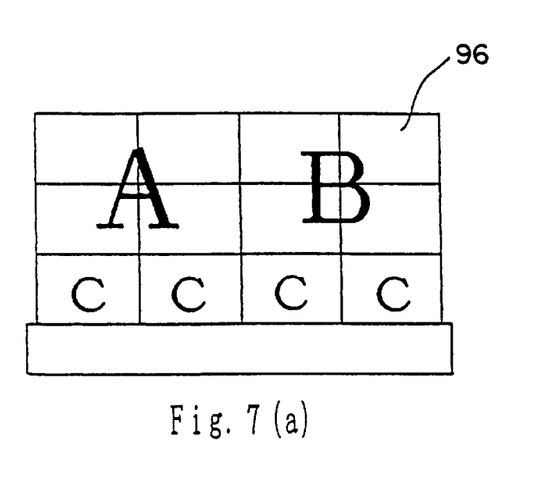
FIG. 7(a) shows a projected image of the conventional multiprojection system.
Figure 7B:
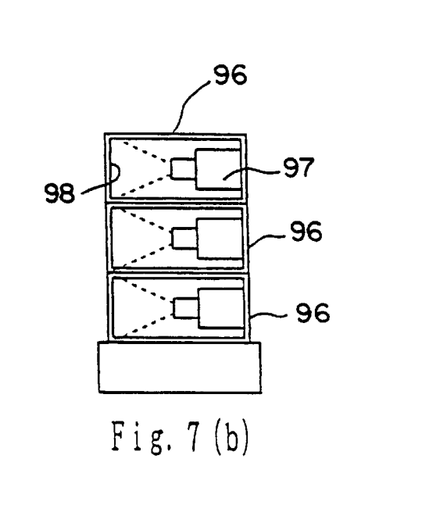
FIG. 7(b) shows a conventional multiprojection system.

In a conventional multiprojection system, as shown in FIGS. 7(a) and 7(b), projection planes of plural projectors are closely contacted with each other so that the projection planes can be regarded as one large image plane, which is called a projection cube system, a multivision system, videowalls or the like.

In one example of the multiprojection system, as shown in FIG. 7(a), 12 projector units 96 each having an image plane size of 600 mm (length)×800 mm (width) are superposed so that three projector units 96 are arranged in lines longitudinally and four projector units 96 are arranged in lines laterally. By such superposing, entire image planes form a large image plane having a size of 1,800 mm (length)×3,200 mm (width).

As shown in FIG. 7(b), a projector 97 is provided in each projector unit 96. There is a screen 98 in front of each projector 97, and an image is projected from the inside by the projector 97.

In these systems, there are some systems in which joints of overlapped portions (including unevenness of luminance) cannot be completely prevented. However, irrespective of this disadvantage, these systems have frequently been used for the following reasons.

That is, most of projectors used in this kind of system are liquid crystal projectors or three tube type projectors using the RGB calorimetric system, or television monitors (CRT) themselves are used. However, in generally used projectors, brightness is limited under the present technology. When an image is enlarged on the above large image plane having a size of 1,800 mm (length)×3,200 mm (width) by one projector, it is difficult to ensure the brightness of the large image plane, so that a screen image cannot be seen clearly when a surrounding space is not made dark.

Therefore, it is attempted to obtain an entirely bright large image plane by making the area of one image plane smaller to ensure each brightness and arranging a large number of small image planes in lines. As a matter of course, this system is not limited to the above system using 12 projectors, and by arranging more than 12 projectors in lines longitudinally and laterally, a larger bright image plane can be constituted.

When a large-sized projection system is used, a large image plane can be obtained by one projector. However, the large-sized projection system is extremely expensive and is not convenient for a representation space which should be moved.

The interesting point of the above system resides in that, for example, as shown in FIG. 7(a), the same image or different images can be projected by each of the above twelve projectors, or one image can be projected by assigning divided images to all or some of the twelve projectors and arranging and compositing the divided images, so that representation of changeful and various combinations can be provided as compared with a system in which an image is projected on a large image plane only by one projector.

Therefore, these systems have frequently been used for a representation space since not only images for presentation in a conference hall and explanation in an exhibition hall can be provided, but also impressive and changeful representation can be made by a large image plane.

However, these systems have, in addition to the above problem that joints cannot be completely prevented, a disadvantage that a representation effect is limited since the size and position of an image of each projector are fixed or since the image of the projector is merely a flat image.

On the other hand, as one means for heightening a representation effect, which is different from a multiprojection system, a technique of moving an image to make representation changeful has been developed. For example, there may be mentioned a technique of arranging a rotating mirror immediately in front of a projection lens of an image to change the projection direction of the image. At the time of projection, if the image is moved merely by rotation of one mirror, there is a drawback that the image is inclined in a reverse direction by the angle of a pan angle of the mirror. Therefore, in order to always move the image in a horizontal state, it is necessary to further use a technique of preventing or correcting inclination of the image.

As a method for projecting an image, in which this disadvantageous inclination of an image is prevented, there has been published, for example, "IMAGE MOVER" disclosed in U.S. Pat. No. 5,365,288. According to the above U.S. patent, "a K mirror in which mirrors are arranged in a K-shaped state" or "a dope prism" is arranged near to an image device of a rotating projection mirror, and the K mirror is rotated in a reverse direction by an angle of ½ of the pan angle of the projection mirror, whereby inclination of a projected image is prevented.

A problem in the method of the above U.S. patent is that five reflecting planes including the K mirror are given in the example of the above U.S. patent, so that when the reflection efficiencies of the respective mirrors are multiplied, loss of about 50% of light brightness is caused. That is, when this method is employed in the system of the present invention, brightness is reduced by half to cause a result which is contrary to one object of a multiprojection system, i.e., "a multiprojection system is used in order to ensure brightness".

This method is mechanically complicated and requires a large-sized apparatus, makes it difficult to introduce a multiprojection system and results in extremely expensive installation. The object of the above U.S. patent is only to move an image singly, and in the above U.S. patent, there is not any concept regarding the multiprojection system of the present invention.

In the screen image market, particularly in a representation space, further changeful representation has been desired accompanied with diversification of representation. That is, in a representation space, an image for presentation to be used as supplement of explanation in a large conference hall or an image merely like an enlarged telescreen is insufficient, and not only an impressive large image plane is required, but also further changeful and artistic representation should be made.

Further, in a representation space, lighting has an important meaning. In the prior art, a screen image and lighting have been considered to be separate from each other and planned and made by different producers. However, in a future representation space, it is an important task to provide new representation by harmonization a screen image with lighting. For example, among lighting equipments, there are a moving light and a mirror scan. In such light equipments, a starting sheet or a color foil having a pattern which is called GOBO is provided, and the above pattern can be projected as light while the color of the pattern is changed.

Since its light can be freely moved, a changeful and dynamic representation effect can be obtained as compared with simple lighting, so that the MOVING LIGHT and the MIRROR SCAN have frequently been used in a representation space.

These moving light and mirror scan can be regarded as one step of harmonization of a screen image with lighting. However, in a future new representation space, it is an important task to heighten the level of such a simple pattern and introduce a screen image which enables more complicated and effective representation into the field of lighting.

In relation to the foregoing, an image control system and a lighting control system have completely been separated in the prior art. Since the interface of signal systems becomes complicated even in one representation, a long preparation time is required. In order to solve such a problem, it is also an important task to enable easy preparation by harmonization of a screen image with lighting.

Further, as a precondition to a method for achieving the above tasks, it is required to supply an inexpensive and simple system and to provide a system satisfying a requirement that joints and unevenness of luminance of each screen image be made as inconspicuous as possible.

SUMMARY OF THE INVENTION

The present invention has been made in order to achieve the above tasks, and an object thereof is to provide a multiprojection system having a possibility of bringing out the creativity of a producer. That is, the means for achieving the tasks of the present invention are as described below.

(1) Each of plural projectors is provided independently with a pan driving device and a tilt driving device so that the direction of projection can be freely changed; and has at least one of functions of freely changing the position or arrangement of an image to be projected, freely changing the size of an image and displaying each image in a flying state.

(2) The relative positional relations of the plural projectors can be changed to change the sizes of images with good precision.

(3) The multiprojection system of the present invention has an additional function that test charts each having at least one circle touching two opposite sides of an image to be projected and at least two straight lines passing the center of the image and crossing at right angles are projected by the plural projectors so that the lines of the images are contacted with each other; the plural test charts projected are comprehensively photographed by a camera; data thereof are inputted to a computer; by image processing, the gaps of the straight lines crossing at right angles and the shapes and/or sizes of the circles are detected; difference from a basic shape memorized in the computer is converted into a correction signal; and the correction signal is given to the respective projector-driving controllers to automatically correct the gaps and shapes of the images.

(4) Each of the plural projectors is provided with at least one of a blackout shutter, a dimming shutter, a focus adjuster, a field angle adjuster and a Size Distortion adjuster.

(5) Focusing of an image to be projected can be always automatically performed accompanied with change in the direction of projection of the image by automatically measuring a distance which changes every moment to a projection target by a distance sensor and automatically controlling a focus adjuster based on a measured value.

(6) The multiprojection system of the present invention has a control system in which a pan angle-designating signal, a tilt angle-designating signal, a focus position-designating signal, a field angle position-designating signal, a blackout shutter-opening or closing signal, a dimming shutter position-designating signal, a RGB control signal of a color changer, a GOBO image-outputting signal and a GOBO-rotating signal are outputted from a lighting operation table directly to the plural projectors via a computer; and an image-controlling signal is outputted from the lighting operation table to the plural projectors via a computer, an image-inputting device and an image-enlarging device.

According to these means, a concept of a conventional system that "a screen image is projected on a fixed screen", i.e., a concept of "two-dimensional expression of a screen image" is removed, and by a freely moving screen image, a system based on a new concept can be provided as "a system in which an entire representation space is a target on which a screen image is to be projected", i.e., "a system for providing expression of a screen image in a three-dimensional space".

Further, according to the means of the present invention, an image having a high level can be freely moved without using a conventional moving light or mirror scan, so that a new style of representation in which a screen image is harmonized with lighting or which is positioned between a screen image and lighting can be made.

BRIEF DESCRIPTION OF THE DRAWINGS

FIG. 1(a) is a view showing a state of projection on a side wall of a first embodiment of the multiprojection system of the present invention, and FIG. 1(b) to FIG. 1(g) each show a projected image of the first embodiment.

DESCRIPTION OF THE PREFERRED EMBODIMENTS

The present invention is explained by referring to the drawings.

First Embodiment

FIG. 1(a) is an illustrative view showing the first embodiment using a system of multiprojection on 9-screens as an example in the case where nine projectors are arranged and projection on a side wall is mainly performed.

Figure 1:
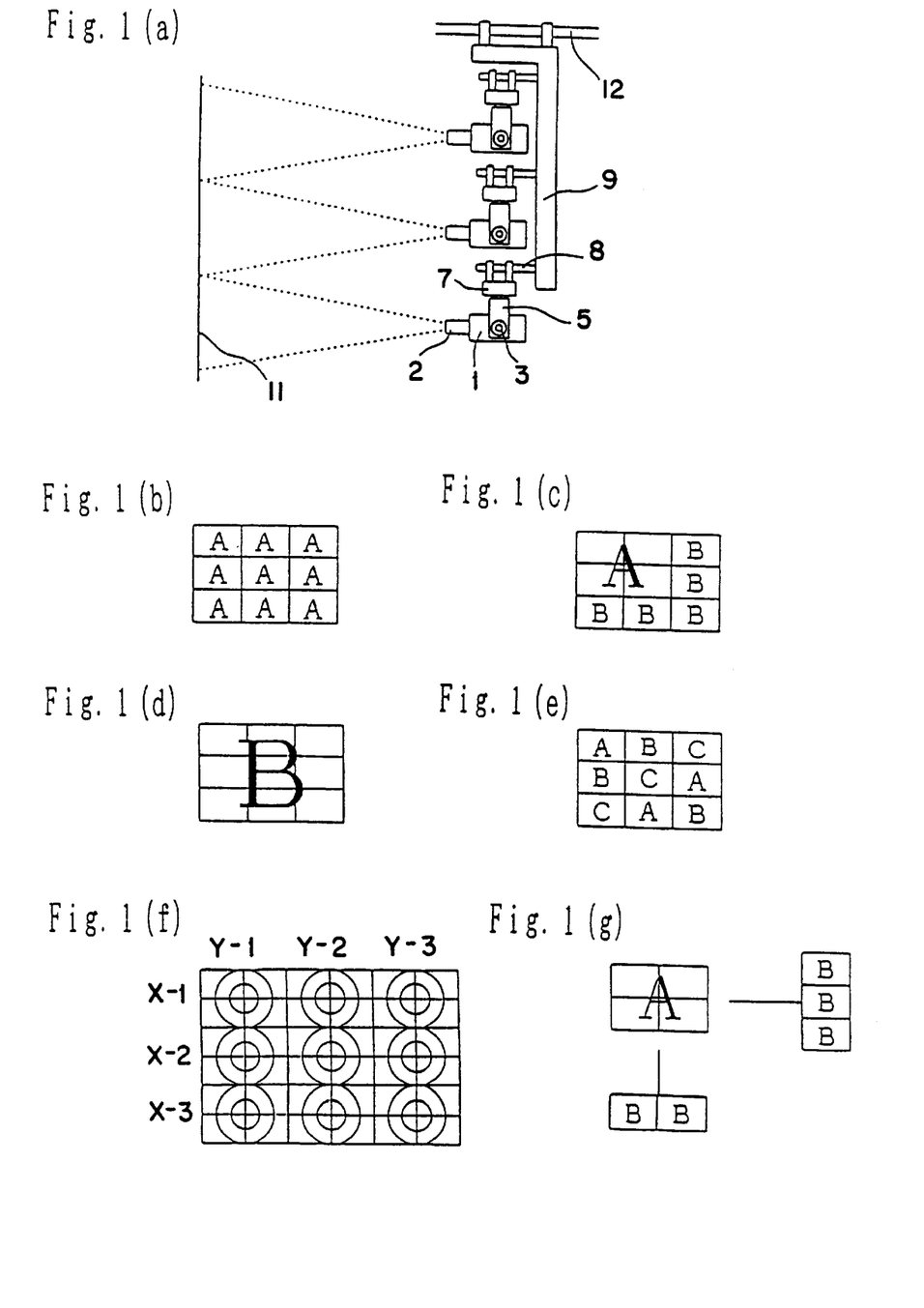

In FIG. 1(a), 1 is a projector, and an image is projected on, for example, a screen 11 via a projection zoom lens 2. Three projectors 1 are arranged longitudinally and laterally, respectively, on extended lines thereof so that nine projectors 1 in total are arranged perpendicularly to the centers of images to be projected.

The projector 1 is supported by a moving arm 5 in the vicinity of the center of gravity and can be rotated in the longitudinal direction by a tilt driving device 3. At the upper center of the moving arm 5, a pan driving device 7 is provided, which supports the moving arm 5 and is rotatable in the lateral direction.

Further, the pan driving device 7 is supported by an arm 8, and the positions of nine projector units are accurately fixed. Each arm 8 is supported by a supporting frame 9 and further fixed to a hanging frame 12 at an upper portion.

As shown in FIG. 1(b), images projected from the nine projectors 1 are arranged as multiprojection on 9-screens on the screen 11. For example, the images on the nine planes in this case are "A". In the example of FIG. 1(c), an image "A" is projected on the left upper four planes in an enlarged manner, and images on the other five planes are "B". In the example of FIG. 1(d), an enlarged image "B" is comprehensively projected on all of the nine planes. In the example of FIG. 1(e), an image of "A", "B" or "C" is projected on each plane. A changeful representation effect is obtained by previously programming such combinations of the kinds and sizes of images along a timing axis and projecting images successively.

The content of the above description is a technique equivalent to a conventional system. As a matter of course, the present invention can be applied thereto.

The images on the nine planes have the same size, but there should not be any gap at the respective portions where the images are contacted with each other. That is, it is necessary to make the sizes and positions of the respective images coincident. In the first embodiment of the present invention, as shown in FIG. 1(f), the respective image test charts are shown to check whether X-1, X-2 and X-3 of X axes crossing the middle points of the respective images are straight without any gap of three planes and whether Y-1, Y-2 and Y-3 of Y axes crossing the middle points of the images are straight without any gap of three planes.

In the present invention, automatic correction is made by comprehensively photographing test chart image planes projected on the nine planes by a CCD (Charge Coupled Device) camera, comparing them with a basic pattern previously memorized in a computer by image processing, quantifying the amount of a gap and inputting the resulting value to pan and tilt driving controllers as pan and tilt driving information.

Since the above test charts are circles touching the upper and lower lines of the images, the sizes of the respective images are adjusted and automatically corrected by, for example, quantifying the overlapping or separating way of the planes which the circles touch and inputting the resulting value to a driving controller of a field angle adjuster (on the premise that the respective projectors are set at predetermined positions).

The test chart explained above is one circle touching the upper and lower sides of the image, but a circle touching the left and right sides of the image may be further added. By these double circles, the gaps of the respective images are made clear to facilitate correction.

In the case of a system in which the above image processing function and automatic correction function are omitted for the purpose of lowering cost, the gaps of the images may be corrected by finely adjusting pan and tilt driving mechanisms or a field angle adjuster by remote control or the like while an operator observes a projected image of the above test chart. Also, depending on the case, the position of the projector 1 relative to the arm 8 may be finely adjusted.

These corrections are made on condition that the above tilt driving device 3 is previously set horizontally, the origin of the above pan driving device 7 is adjusted, and "adjustment at 0 point" of the above respective projectors 1 is previously performed at positions perpendicular to the centers of the respective images projected on the screen 11.

As a matter of course, a mechanism in which less backlash occurs is used for the pan driving device 7 and the tilt driving device 3.

The first characteristic feature of the present invention resides in that, for example, the arrangement of the images in FIG. 1(c) can be instantaneously changed to the arrangement of the images shown in FIG. 1(g). FIG. 1(g) shows an example that representation is made changeful by leaving "A" on four planes, moving three planes of "B" to the right and moving two planes of "B" downward.

The above characteristic feature cannot be obtained in a conventional multiprojection system, and the novel characteristic feature of the present invention enables changeful representation. Further, joints of images which cause a problem in a conventional method can be made inconspicuous within the range of adjustment precision since overlapping of images can be freely adjusted.

Further, since the projector 1 has a field angle adjustment (zoom) mechanism (not shown), the respective images can be made large or small. In this case, for example, images are made large or small by changing the pan angles and tilt angles of the projectors 1 except for the projector 1 positioned at the center toward the centers of the images the sizes of which have been changed. However, when the screen 11 on which images are to be projected is flat, an entire image is enlarged more toward the left, right, upper and lower edges, so that the entire image is not rectangular.

There is a problem that a slight gap is generated at each contact line of the respective image planes. Therefore, depending on an image projected in an enlarged manner, the gap becomes conspicuous, so that the content of representation (a representation software) is limited. A measure for removing this limitation is explained as a third embodiment described below.

Second Embodiment

Figures 2A, 2B:
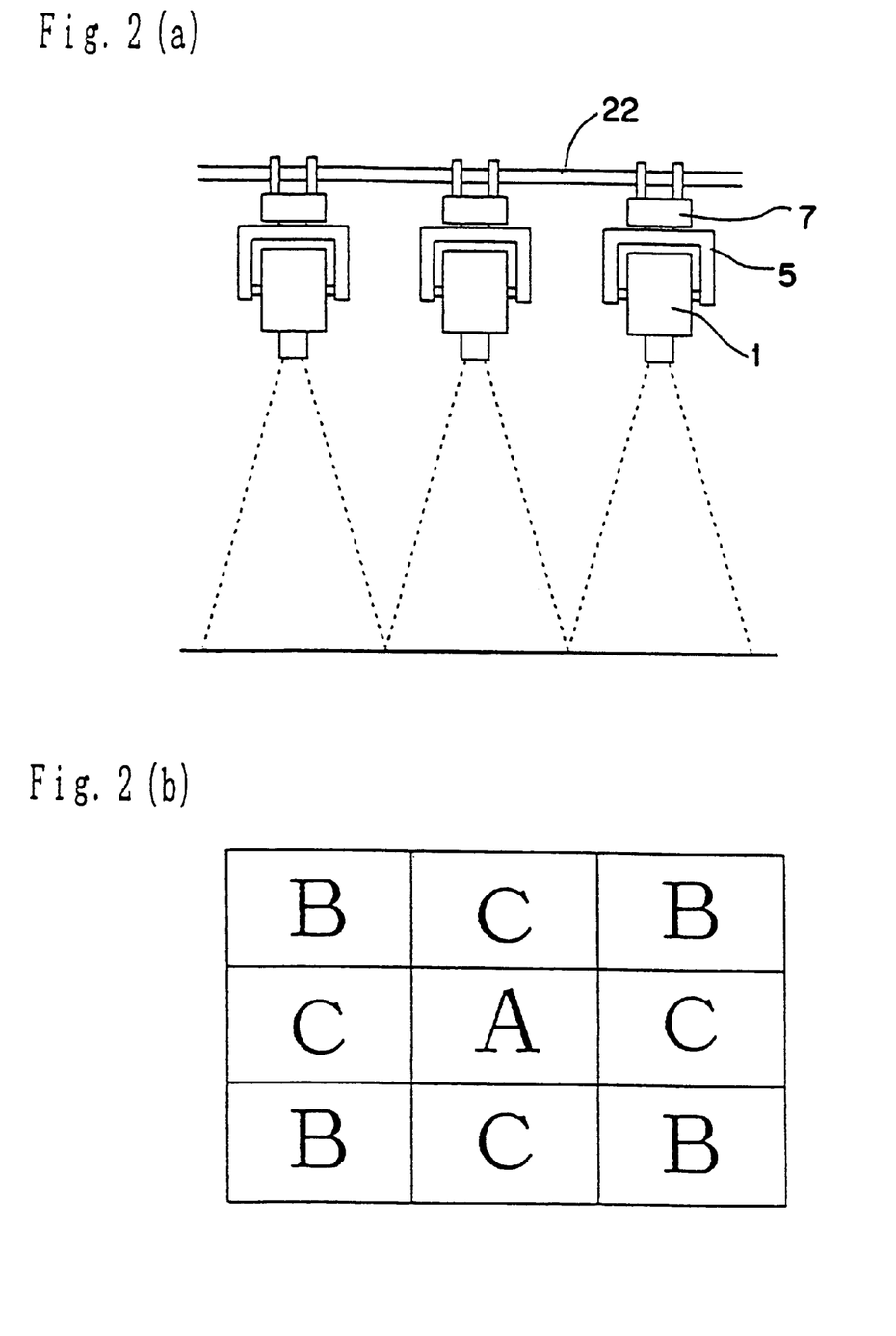
FIG. 2(a) is a view showing a state of projection on a floor of a second embodiment of the multiprojection system of the present invention.
FIG. 2(b) shows a projected image of the second embodiment.

The second characteristic feature of the present invention as a second embodiment resides in that, for example, even when an image is mainly projected on a floor, it can be performed by arranging projectors as shown in FIG. 2(a). Each of nine projectors 1 is directly fixed to a hanging frame 22 at an upper portion via a moving arm 5 and a pan driving device 7.

Such arrangement cannot be made in a conventional method, and this arrangement shows that various representations having a concept of lighting rather than a concept of an image can be made.

FIG. 2(b) shows a state that nine planes are gathered at predetermined positions as image arrangement in the case of multiprojection on 9-screens.

The third characteristic feature of the present invention resides in that the respective images are freely flown.

Figure 3A:
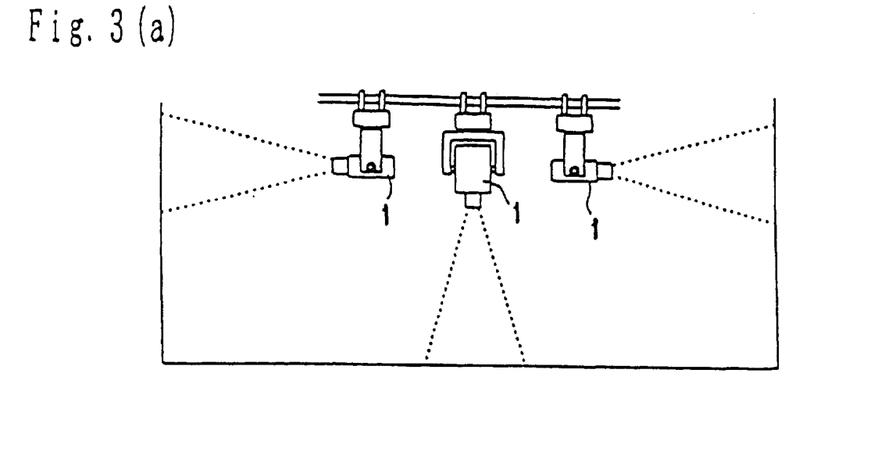
FIG. 3(a) is a view showing an embodiment of moving images freely.
Figure 3B:
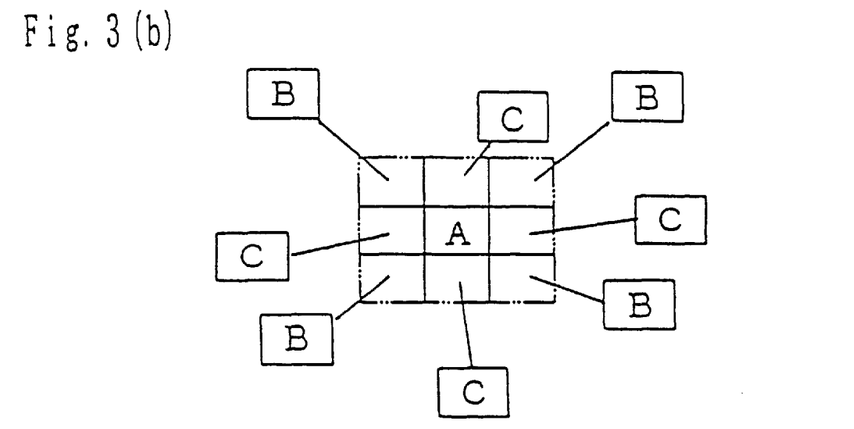
FIG. 3(b) shows a state of flying images.

FIG. 3(a) shows an example that the projectors 1 except for the projector 1 positioned at the center are rotated laterally. That is, not only a floor but also a wall are projection targets, and images are freely flown thereon to constitute a completely new representation space. FIG. 3(b) shows a manner of flying screen images, and their arrangement and combination are not limited at all. For example, eight planes other than one plane may be flown, and the respective three planes may be projected by being divided and moved, which is not shown.

Such a combination is diversified as the number of planes becomes larger, for example, 12 or 25, and limitless effective representation can be made by the creativity of a director. By changing the flying speeds of the respective images and the relative positional relation thereof every moment, representation which could not be made in the prior art can be made.

In such a way of using the projectors 1 as a developed system of a moving light or the like which is one of conventional lighting equipments, complicated representation can be made by further freely moving a screen image having a level much higher than a conventional level. That is, new representation holding an intermediate position between an screen image and lighting can be realized.

Figure 3C:
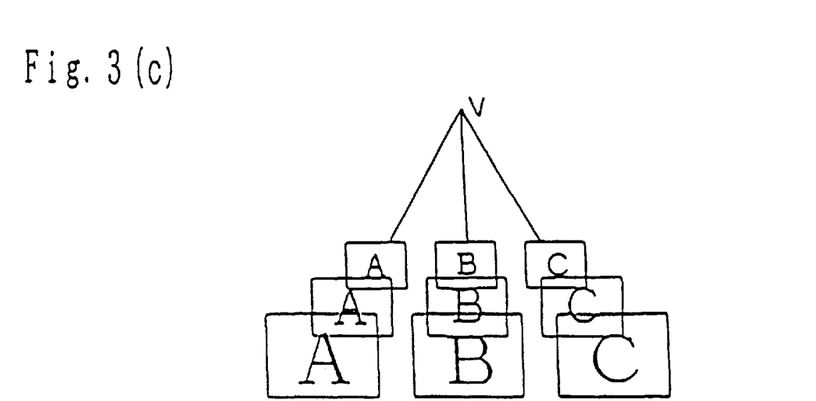
FIG. 3(c) shows a state of changing the sizes of images and overlapping the images.

As shown in FIG. 3(c), the fourth characteristic feature of the present invention resides in that since the positions and sizes of images can be freely changed and mutual images can be freely overlapped, changeful representation which could not be made in the prior art can be made. In the example shown in FIG. 3(c), the sides and positions of images on upper and lower three planes of an image plane of multiprojection on 9-screens are successively changed, and the images are overlapped to express a feeling of depth. In such arrangement, all of the images are moved with a vanishing point V being fixed (at the center) to enable expression having a further cubic effect.

Further, the color shades and hues of overlapped images having different sizes may be changed, and also the freely flying images of the present invention may be combined with a large image plane of another fixed projector as a background, which are not shown. By these means, symbolic expression and a special effect which could not be aimed in the prior art can be aimed.

Third Embodiment

Figure 4A:
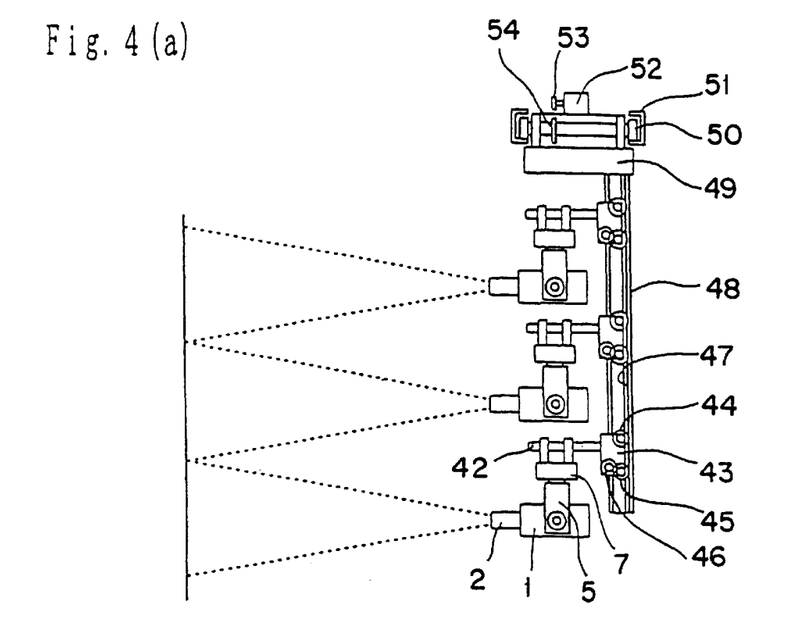
FIG. 4(a) to FIG. 4(c) each show a third embodiment of the multiprojection system of the present invention, in which the sizes of images are changed without causing image distortion.

In the third embodiment of the present invention, for example, in the case of multiprojection on 9-screens, the relative positional relation, i.e., the arrangement relation of the respective projectors 1 themselves can be changed longitudinally and laterally in order to change the sizes of images by a field angle adjuster as accurately as possible without causing image distortion, which is shown in FIG. 4(a).

Figure 4B:
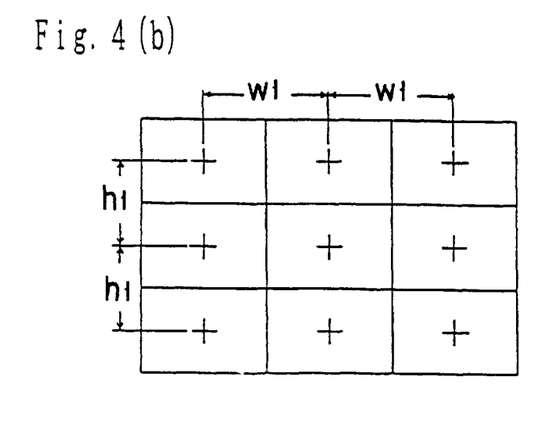
Figure 4C:
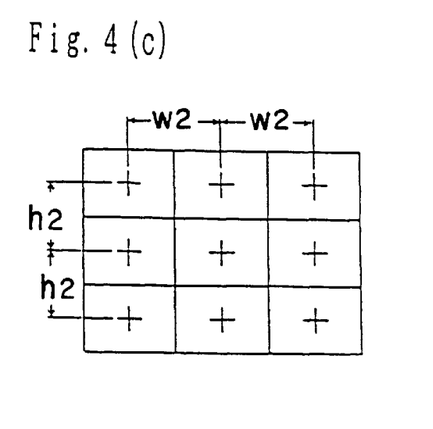

For example, in an example of the case where the respective images are made smaller, when the entire size of images is changed from a size shown in FIG. 4(b) to a size shown in FIG. 4(c) by a projection zoom lens 2, longitudinal distances h1 and lateral distances w1 between the centers of the respective projectors 1, i.e., the centers of the respective images of multiprojection on 9-screens are required to be changed to h2 and w2, respectively.

In this embodiment, in order to always arrange each projector 1 on a line extended perpendicularly to the center of an image which has been changed, the following moving mechanism is used.

The projector 1 is fixed to an arm 42 via a moving arm 5 and a pan driving device 7, and the arm 42 is fixed to an elevating carriage 43. The elevating carriage 43 has four wheels 44 and guided by the inner side of an elevating frame 48. The elevating frame 48 takes charge of longitudinally arranged three projectors 1, and in the case of nine planes, three sets thereof are required.

At the inner side of the elevating frame 48, a rack gear 47 is arranged. The rack gear 47 is engaged with a pinion 45 fitted to one of the wheels 44, and the elevating carriage 43 itself is moved upward or downward by rotation of an elevating device 46 provided in the elevating carriage 43.

The upper edge of the elevating frame 48 is fitted to a running frame 49. At the upper portion of the running frame 49, two running wheels 50 are arranged at the left and right sides, respectively.

The running wheels 50 are run by being guided by the inner side of a main frame 51 which is hung from a further upper portion. The running wheels 50 are rotated and run by a running motor 52 via chain wheels 53 and 54.

By these devices, the sizes of images can be accurately changed, and the above problem of causing image distortion can be solved. For example, if brightness is desired even when images having a large size shown in FIG. 4(b) are changed to small images as shown in FIG. 4(c), the above moving mechanism can be used.

When a large image is desired even if brightness is reduced, the relative positional relation of the respective projectors 1 may be adjusted to be wider in order to further enlarge images so as to have a size larger than that of FIG. 4(b).

These mechanisms can be arranged in a horizontal direction by changing the fitting direction of the arm 42 relative to the elevating carriage 43 in the case of projection not on a wall but on a floor, and also can be applied to arrangement inclined at 45°. When these mechanisms are basically used, a design can be changed so that the angle of the elevating frame 48 can be changed from a perpendicular direction to a horizontal direction non-stepwise.

Further, in the above explanation, an example of moving wheels of a carriage by driving an electric motor is shown as a mechanism of changing the position of the projector 1. However, such an object can be achieved by another driving method.

For example, the projector 1 may be elevated or lowered by a screw, a block supporting the projector 1 may be elevated or lowered directly by using a linear motor which moves linearly, and movement of the running flame 49 relative to the main flame 51 may be used as a linear motor.

In the above third embodiment, the driving mechanisms of all of the projectors 1 are the same in consideration of, for example, moving entire images of multiprojection on 9-screens longitudinally and laterally.

Fourth Embodiment

Figure 5A:
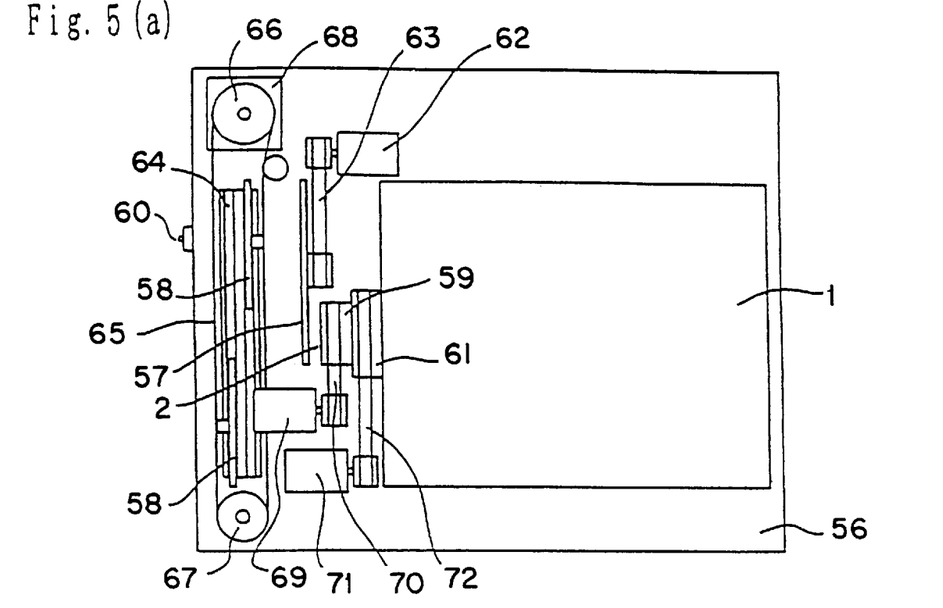
FIG. 5(a) is a plane view showing an inner portion seen from an upper side after removing a cover, of a fourth embodiment of the multiprojection system of the present invention.

In the fourth embodiment of the present invention, a blackout shutter 57, a dimming shutter 58, a focus adjuster 59, an infrared range finder 60 and a field angle adjuster 61 are provided in front of a projection zoom lens 2 of each projector 1. FIG. 5(a) shows an internal constitution seen from an upper side after a cover of an upper face is removed.

Under the projector 1, a fitting frame 56 is provided, and at the end of a projection direction of the fitting frame 56, the blackout shutter 57 and the dimming shutter 58 are arranged so that the front face of the projection zoom lens 2 is covered therewith.

The blackout shutter 57 is provided for the purpose of complete dark change since slight light is transmitted even when light is controlled to the most "black" side in the case where a projector to be used is a liquid crystal projector.

However, when a liquid crystal projector is improved by, for example, greatly increasing a liquid crystal contrast ratio, the blackout shutter 57 is not required.

Figure 5B:
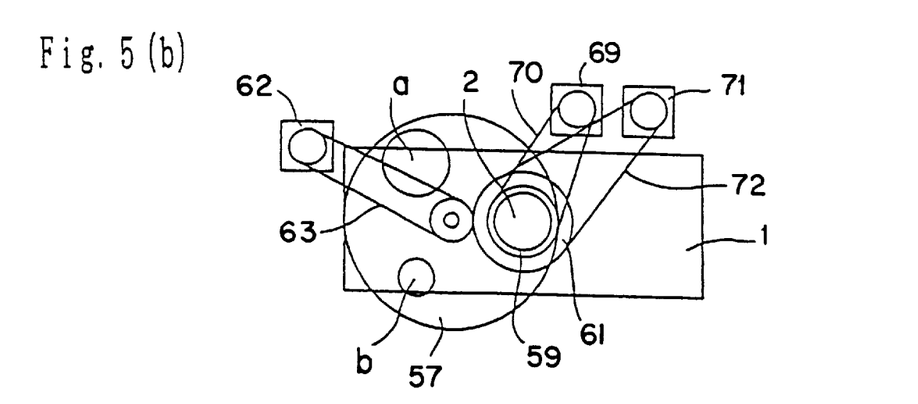
FIG. 5(b) is a front view showing the structure of a blackout shutter portion of the fourth embodiment.

As shown in FIG. 5(b), the blackout shutter 57 is a disk having plural openings a and b, arranged so that the front face of the zoom lens 2 is covered therewith. The blackout shutter 57 is supported by a bearing (not shown, hereinafter an explanation regarding a bearing is omitted) supported by the fitting frame 56 and driven by a shutter-rotating motor 62 via a timing belt 63.

When the opening a comes in front of the zoom lens 2, the blackout shutter 57 is in an opened state, and when the disk face other than the opening a or b comes in front of the zoom lens 2, it is in a closed state. The slightly small opening b is provided in the disk of the blackout shutter 57, and when the opening b comes in front of the zoom lens 2, the brightness of an image to be projected is reduced since the diameter of the opening b is small. That is, the brightness of a screen image when the blackout shutter 57 is in an opened state can be instantaneously changed by switching the openings a or b.

Figure 5C:
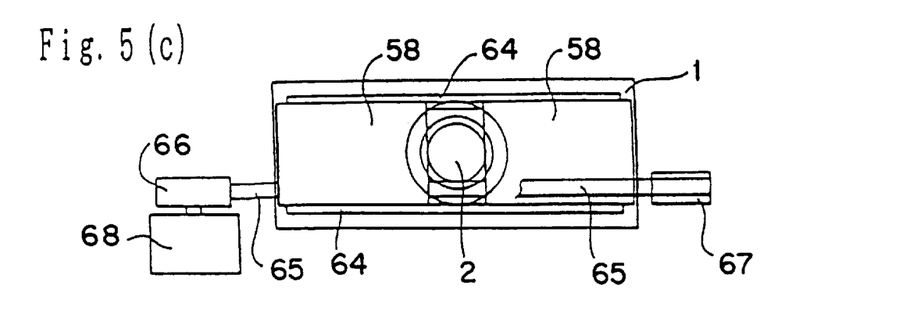
FIG. 5(c) is a front view showing the structure of a dimming shutter portion.

The dimming shutter 58 is provided for the purpose of smoothly performing switching of the brightness of an image by the so-called fade-in and fade-out at the time of representation.

As shown in FIG. 5(c), the dimming shutter 58 is constituted by two glass plates subjected to gradation treatment for increasing a density successively from the center toward the outside (a left or right end), and each one glass plate is symmetrically arranged at the left and right sides from the center of the zoom lens 2. The dimming shutter 58 is movable laterally by being guided by slide rails 64 arranged at the upper and lower sides in parallel with each other.

One glass plate of the dimming shutter 58 is fixed to the side face at a front side of projection of a timing belt 65 which is set endlessly, and the other glass plate thereof is fixed to the side face at a rear side of projection of the timing belt 65. The timing belt 65 is passed between a driving pulley 66 and a free pulley 67. The driving pulley 66 is rotated by a shutter-conveying motor 68, and by this rotation, a pair of the glass plates of the dimming shutter 58 fixed to the timing belt 65, respectively, are laterally opened or closed.

Therefore, accompanied with movement of the glass plates subjected to the above gradation treatment in front of the zoom lens 2, transmittance is changed, so that projected light is dimmed. The above explanation is made based on a dimming shutter which is laterally opened and closed.

However, the object can be also achieved by rotating a disk-shaped glass plate subjected to gradation treatment.

As shown in FIG. 5(a) and FIG. 5(b), the projection zoom lens 2 of the projector 1 is equipped with the focus adjuster 59. When a distance to an image projection target is not greatly changed, focusing may be previously performed by manual operation. However, when a distance to an image projection target is greatly changed accompanied with movement of an image, the automatic focus adjuster 59 is required.

The focus adjuster 59 adjusts the focus of a projected image by being rotated by a focus-adjusting motor 69 via a timing belt 70.

The automatic focus adjuster 59 in this embodiment is used in combination with an automatic range finder. That is, a distance to a screen or a wall, which is changed every moment accompanied with change in a direction of projecting an image, is measured by an automatic range finder, for example, the infrared range finder 60. By a measured signal, the automatic focus adjuster 59 is automatically controlled to enable automatic focusing of an image on a screen or a wall.

The field angle adjuster 61 adjusts a field angle by rotating the projection zoom lens 2 and changes the size of an image. When the size of an image shown in FIG. 4(b) is to be changed to a size as shown in FIG. 4(c) in the above third embodiment, the field angle adjuster 61 is actuated.

The field angle adjuster 61 is rotated by a field angle-adjusting motor 71 via a timing belt 72 to change the size of a projected image.

The actuation amount of the field angle adjuster 61 is automatically controlled by a signal from a detector which detects the changed amount of an elevating or running position for moving the projector 1, for example, a rotary encoder (not shown).

In the first embodiment, when the gaps and sizes of images are finely adjusted by using test charts of nine planes, the field angle adjuster 61 is actuated by the above signal from a computer.

As an example of handling of the field angle adjuster 61, when a distance to a projection target is changed accompanied with movement of an image, if it is desired to keep the size of an image constantly, the field angle adjuster 61 may be controlled by a signal of the infrared range finder 60.

In this embodiment, a Size Distortion correction device is added to make the shape of an image more accurate and more clear. "Size Distortion" refers to image distortion in its size and/or shape caused in the case where a projection center line of the image projection on a screen is not perpendicular to a projection plane when an image is freely moved. When an angle between the projection center line and the projection plane is smaller than 90° and the resulting Size Distortion constitute an obstacle to representation, it is necessary to correct the Size Distortion.

In the Size Distortion correction device (not shown), Size Distortion are adjusted by automatic calculation based on change in an angle in which a pan angle and a tilt angle are synthesized with an angle between a projection center line and a screen or a wall on which an image is to be projected, i.e., the origin being used as a standard.

Although a correction value is limited, Size Distortion can be corrected to an extent which does not constitute an obstacle in practical use. As a correction principle and calculation thereof, reference can be made to a paragraph regarding Size Distortion correction of "Moving projector system" of Japanese Patent Application No. 304337/1995 (Japanese Patent Provisional Publication No. 149296/1997).

An example of a basic system constitution described above is shown in FIG. 6.

Figure 6:
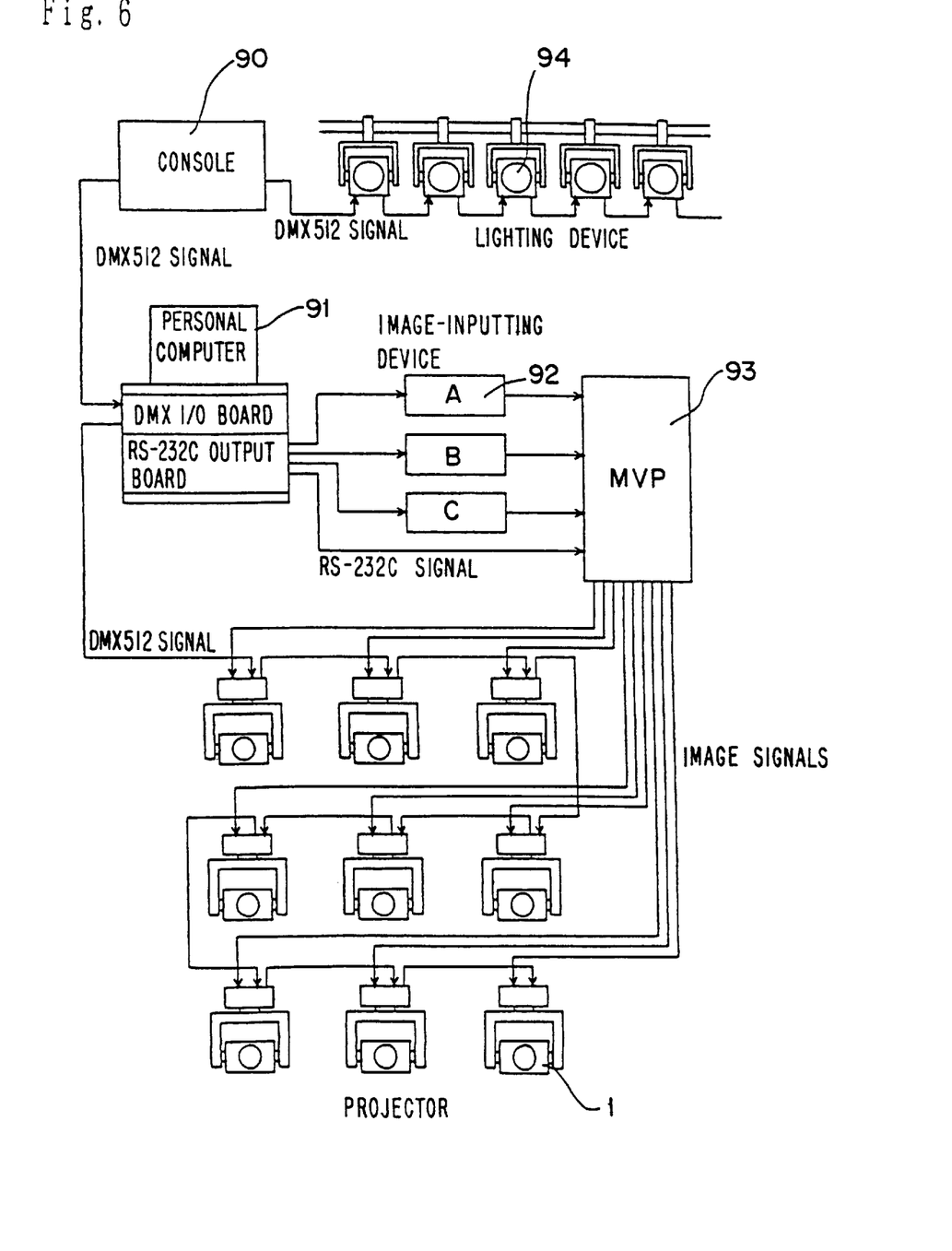
FIG. 6 shows an example of a system constitution in the case of multiprojection on 9-screens.

FIG. 6 shows an example of a system constitution in the case of multiprojection on 9-screens, which is a constitution that stress is laid on harmonization of a screen image with lighting. That is, all of the movement control and image control of each projector 1 can be performed from a lighting operation console 90 to improve efficiency such as shortening of a preparation time.

Various signal systems have been used in a conventional lighting control system. However, in the example of this system constitution, control of a screen image is performed by using a DMX512 signal system as a serial signal which has most generally been used.

DMX512 is a signal system in which RS-485 [a signal according to the EIA (Electronics Industries Association) standard] is standardized by USITT (United States Institute for Theatre Technology) for a dimming signal of lighting, in which stress is laid on a digital serial signal-transmitting system. This system can transmit signals of 512 channels at the maximum (512 bytes of 00 to FF data) in a cyclic way (about 44 times per second) to a distance of about 1,200 m by a 5-pin "XLR" (popular name; CANNON or Neutrik) cable, which is an extremely simple standard.

Recently, this system has frequently been used not only for controlling a dimming level but also for controlling driving of various parts of the above moving light or the like.

First, an example of channel assignment of DMX512 signals is explained with reference to the system constitution of FIG. 6.

In a screen image system, the following is controlled by the lighting operation console 90.

1 channel to 100 channel (hereinafter abbreviated to "ch") of DMX512 are assigned to a screen image. In the embodiment of FIG. 6, three kinds of images "A", "B" and "C" are described as images which are handled at one time. However, the number of images can be increased. In the following channel assignment, channels are assigned in consideration that a system is enlarged.

1 ch to 64 ch are assigned to switching of outputs "A", "B" and "C" from an image-outputting device No. 1 to an image-outputting device No. 64.

65 ch to 69 ch are assigned to control of starting and stopping of inputting source equipment and materials.

70 ch to 74 ch are assigned to switching of outputs "A", "B" and "C" from an image-enlarging basic pattern No. 1 to an image-enlarging basic pattern No. 5.

Explanation will be made by taking an example of handling of this enlarging basic pattern. In the example of FIG. 1(c), when an image "A" is to be enlarged on left upper four planes, the output (of a signal outputted from the lighting operation console 90) of 70 ch is 0%. When the output of 70 ch is 50%, an image "B" is projected on the four planes at the same position, and when the output of 70 ch is 70%, an image "C" is projected on the four planes at the same position.

Right upper four planes are enlarged by 71 ch, left lower four planes are enlarged by 72 ch, and right lower four planes are enlarged by 73 ch.

Further, in the case of an image "B" entirely enlarged on nine planes shown in FIG. 1(d), the output of 74 ch is 50%. When the output of 74 ch is 0%, an entire image on nine planes becomes "A", and when the output of 74 ch is 100%, an entire image on nine planes becomes "C".

75 ch to 100 ch are assigned to switching of outputs "A", "B" and "C" from an image-enlarging optional pattern No. 1 to an image-enlarging optional pattern No. 25. These channels are handled as described above.

101 ch to 512 ch are assigned to an operation system, a color changer and GOBO. The respective 17 channels are assigned to the respective projectors, i.e., 24 projectors at the maximum. An example of assigning the respective 17 channels to the respective projectors is shown below.

101 ch to 103 ch are assigned to the precision of 3 bytes of pan angle designations 1, 2 and 3, and 104 ch and 105 ch are assigned to the precision of 2 bytes of tilt angle designations 1 and 2.

106 ch is assigned to designation of a focus adjustment position, 107 ch is assigned to designation of a field angle adjustment position, 108 ch is assigned to designation of a dimming shutter position, and 109 ch is assigned to designation of a blackout shutter position, respectively.

110 ch is assigned to switching of internally memorized screen image data and externally inputted screen image data of images.

111 ch to 113 ch are assigned to control of internally inputted colors R, G and B, 114 ch is assigned to control of internally inputted contrast, 115 ch is assigned to control of internally inputted luminance, 116 ch is assigned to control of internally inputted GOBO, and 117 ch is assigned to control of internally inputted GOBO rotation, respectively.

According to the above assignment, not only a driving system, a color changer, GOBO and the like but also control of a screen image system can be controlled from the lighting operation console 90.

Signals are flowed as described below. DMX512 signals are sent to a personal computer 91 from the lighting operation console 90, and signals of a driving system, a color changer and GOBO are outputted as DMX512 signals to each projector 1.

A screen image control signal from the lighting operation console 90 is converted into a RS-232C signal by the personal computer 91 and outputted to each projector 1 after processing and allocation of image enlargement are controlled by MVP (a multiple video processor) 93 which is an image-enlarging device.

An image of "A", an image of "B" and an image of "C" are inputted by an image-inputting device 92 and outputted to each projector 1 after processing and allocation of image enlargement are controlled by the MVP 93. RS-232C is a representative system for transmitting digital signals, i.e., a signal system using a serial transmitting system used for data communication of a computer.

From the lighting operation console 90, DMX512 signals are outputted by another system for controlling dimming of common lighting equipments 94, for example, a color changer and lighting. The respective lightings are controlled in harmony with movements of the above respective images and projectors, so that a conventional lighting system can be harmonized with a new screen image system. In a system in which the number of devices to be controlled is large, all of them can be controlled by one system of DMX512.

As this system constitution, the above example is explained. However, in a theme park where representation is repeated many times, the lighting operation console 90 is not necessarily required. In that case, the system constitution of FIG. 6 from which the lighting operation console 90 is removed may be employed. Also, the personal computer 91 may be designed to have the function of the lighting operation console 90, and data regarding a screen image including a control system can be outputted to each projector 1.

In the above explanation, the signals from the lighting operation console 90 are described as DMX512 signals. However, as a matter of course, the object can be achieved by using signals of other serial communication.

Also, as the example of the present invention, multi-projection on 9-screens is described. However, the present invention can be applied to multiprojection on 12 planes, 25 planes, 100 planes or the like without any problem if, for example, a system in which plural DMX512 systems are used or the numbers of the image-inputting device 92 and the MVP 93 as an image-enlarging device are increased is used.

The present invention is explained above while stress is mainly laid on harmonization of a screen image with lighting. However, the present invention can be also applied to harmonization of a screen image with sound. For example, plural loudspeakers are arranged in a representation space, and the qualities and volumes of sounds from the respective loudspeakers are controlled so as to be changed in harmony with the pan and tilt rotation signals of projectors, i.e., moving images, so that impressive moving stereophonic sound can be reproduced together with a screen image.

Further, by providing each projector with a sensor which detects a sound wave-generating position, the projector can be made to face toward a sound wave-generating direction, and by detecting change in the quality and volume of sound, an image can be changed or the color of a color changer can be changed.

The respective functions and characteristics within the range claimed in the present invention can be applied to not only a multiprojection system but also a commonly used projector. For example, complete dark change and adjustment of brightness can be performed by providing the blackout shutter 57 and the dimming shutter 58 in front of a common liquid crystal projector.

Even when the projector of the present invention is used singly, the respective functions and characteristics of the present invention are effective.

As described above, according to the present invention, the above tasks in a representation space can be achieved.

That is, changeful and artistic representation can be made based on an impressive large image plane which can cope with diversification of representation. Also, by harmonization of a screen image with lighting, as new representation, a screen image which enables more complicated and effective representation other than a single pattern level of a moving light or the like can be introduced into the field of lighting.

A common signal system is used in a screen image control system and a lighting control system, and systems including a screen image system can be controlled from a lighting operation system, so that preparation can be easily performed.

Further, these means can be supplied as an inexpensive and compact system, and joints of the respective screen images, which is a problem in a conventional system, can be also made as inconspicuous as possible.

By these systems, a conventional concept of two-dimensional expression of a screen image is removed, and by a freely moving screen image, a system based on a new concept can be provided as three-dimensional expression of a screen image, so that the creativity of a producer can be unlimitedly brought about.

We claim:

1. A multiprojection system comprising:
   a plurality of projectors for projecting images arranged in lines longitudinally and laterally such that any of : (i) all of the projected images become one image; (ii) an entirely enlarged image or divided images is projected; and (iii) an individual image is projected;
   wherein: (i) each of the plurality of projectors is provided independently with a pan driving device and a tilt driving device so that a direction of projection of each of the projectors can be freely changed; (ii) each of the plurality of projectors has least one of functions of changing the direction of projection, a position of a projected image, a synthesis or arrangement of the projected images, and a size of the projected image, and (iii) each image is displayed in a flying state to form a screen image system harmonized with lighting in a representation space; and
   wherein (i) the plural projectors project test charts each having at least one circle touching two opposite sides of an image to be projected and at least two straight lines passing a center of the image and crossing at right angles so that the lines of the images contact with each other, (ii) the projected test charts are comprehensively photographed by a camera, (iii) data of the photographed test charts are inputted to a computer, (iv) gaps of the straight lines crossing at right angles and shapes and sizes of the circles are detected by image processing, (v) a difference from a basic shape memorized in the computer is converted into a correction signal; and (vi) the correction signal is provided to respective projector-driving controllers to automatically correct gaps and shapes of the images.

2. Multiprojection system comprising:
   a plurality of projectors for projecting images arranged in lines longitudinally and laterally such that any of: (i) all of the projected images become one image, (ii) an enlarged image or divided images is projected, and (iii) an individual image is projected;
   wherein: (i) each of the plurality of projectors is provided independently with a pan driving device and a tilt driving device so that a direction of projection of each of the projectors has least one of functions of changing the direction of projections, a position of a projected image, a synthesis or arrangement of the projected images, and a size of the projected image, and (iii) each image is displayed in a flying state to from a screen image system harmonized with lighting in a representation spaces; and
   wherein focusing of an image to be projected is automatically performed accompanied with a change in the direction of projection of the image, by automatically measuring a distance which changes every moment to be a projection target using a distance sensor and by automatically controlling a focus adjuster based on a measured value.

3. The system according to claim 2, wherein relative positions of the plurality of projectors can be independently changed to change the sizes of the projected images without causing image distortion.

4. The system according to claim 2, wherein each of the plurality of projectors is provided with at least one of a blackout shutter for complete dark change, dimming shutters for fade-in and fade-out, a focus adjuster, a field angle adjuster and a size distortion adjuster.

5. The system according to claim 2, further comprising a control system wherein a pan angle-designating signal, a tilt angle-designating signal, a focus poition-designating signal, a field angle position-designating signal, a blackout shutter-opening or closing signal, a dimming shutter position-designating signal, a RGB control signal of a color changer, a GOBO image- outputting signal and a GOBO-rotating signal are outputted from a lighting operation console directly to the plural projectors via a computer, and an image-controlling signal is outputted from the lighting operation console to the plural projectors via a computer, an image-outputting device and an image-enlarging device.

6. A multiprojection system comprising:
   a plurality of projectors for projecting images arranged in lines longitudinally and laterally so as to form a screen image in a three-dimensional space in a manner such that any of: (i) all of the projected images become one image, (ii) an enlarged image or divided images is projected, amd (iii) an individual image is projected;
   wherein: (i) each of the plurality of projectors is provided independently with a pan driving device and a tilt driving device so that a direction of projection of each of the projectors has least one of functions of changing the direction of projection, a position of a projected image, a synthesis or arrangement of the projected images, and a size of the projected image, and (iii) each image is displayed in a flying state to form a screen image system harmonized with lighting in a representation space.

7. The system according to claim 6, wherein relative positions of the plurality of projectors can be independently changed to change the sizes of the projected images without causing image distortion.

8. The system according to claim 6, wherein each of the plurality of projectors is provided with at least one of a blackout shutter for complete dark change, dimming shutters for fade-in and fade-out, a focus adjuster, a field angle adjuster and a size distortion adjuster.

9. The system according to claim 6, further comprising a control system wherein a pan angle-designating signal, a tilt angle-designating signal, a focus poition-designating signal, a field angle position-designating signal, a blackout shutter-opening or closing signal, a dimming shutter position-designating signal, a RGB control signal of a color changer, a GOBO image- outputting signal and a GOBO-rotating signal are outputting from a lighting operation console directly to the plural projectors via a computer, and an image-controlling signal is outputted from the lighting operation console to the plural projectors via a computer, an image-outputting device and an image-enlarging device.

10. A multiprojection system comprising:

plurality of projectors for projecting images arranged in lines longitudinally and laterally so as to form a screen image in a three-dimensional space in a manner such that any of: (i) all of the projected images become one image, (ii) an enlarged image or divided images is projected, and (iii) an individual image is projected;

wherein: (i) each of the plurality of projectors is provided independently with a pan driving device and a tilt driving device so that a direction of projection of each of the projectors can be freely changes, (ii) each of the plurality of projectors has least one of functions of changing the direction of projection, apositon of a projected image, a synthesis or arrangement of the projected images, and a size of the projected image, and (iii) each image is displayed in a flying state to form a screen image system harmonized with lighting in a representation space; and wherein an outer profile of adjacent ones of the projected images are arranged and joined without substantially overlapping each other, thereby creating the screen image to be larger than the individual projected images.

11. The system according to claim 10, wherein relative positions of the plurality of projectors can be independently changed to change the sizes of the projected images without causing image distortion.

12. The system according to claim 10, wherein each of the plurality of projectors is provided with at least one of a blackout shutter for complete dark change, dimming shutters for fade-in and fade-out, a focus adjuster, a field angle adjuster and a size distortion adjuster.

13. The system according to claim 10, further comprising a control system wherein a pan angle-designating signal, a tilt angle-designating signal, a focus position-designating signal, a field angle position-designating signal, a blackot shutter- opening or colsing signal, a dimming shutter position-designating signal, a RGB control signal of a color changer, a GOBO image- outputting signal and a GOBO-rotating signal are outputted from a lighting operation console directly to the plural projectors via a computer, and an image-controlling signal is outputted from the lighting operation console to the plural projectors via a computer, an image-outputting device and an image-enlarging device.

* * * * *